US012665261B2

(12) United States Patent
Hofer

(10) Patent No.: US 12,665,261 B2
(45) Date of Patent: Jun. 23, 2026

(54) CELL CONNECTOR FOR CONNECTING ROUND CELLS OF A BATTERY

(71) Applicant: Lisa Draexlmaier GmbH, Vilsbiburg (DE)

(72) Inventor: Guido Hofer, Weng (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 720 days.

(21) Appl. No.: 17/948,360

(22) Filed: Sep. 20, 2022

(65) Prior Publication Data

US 2023/0089971 A1      Mar. 23, 2023

(30) Foreign Application Priority Data

Sep. 21, 2021    (DE) ..................... 10 2021 124 360.2

(51) Int. Cl.
*H01M 50/503*        (2021.01)
*H01M 10/48*        (2006.01)
(Continued)

(52) U.S. Cl.
CPC ....... *H01M 50/503* (2021.01); *H01M 10/482* (2013.01); *H01M 50/213* (2021.01);
(Continued)

(58) Field of Classification Search
CPC ............. H01M 50/503; H01M 50/516; H01M 50/569; H01M 50/505; H01M 10/482; H01M 2220/20; H01M 50/213
See application file for complete search history.

(56) References Cited

U.S. PATENT DOCUMENTS 7,258,550 B2 *    8/2007    Chen .................. H01R 13/2435
                                                                    439/66
2005/0148238 A1 *    7/2005    Chen .................... H01R 12/714
                                                                    439/607.01
(Continued)

FOREIGN PATENT DOCUMENTS

CN              112332031 A    *    2/2021    .......... H01M 50/503
DE        102019200004        7/2020
(Continued)

OTHER PUBLICATIONS

CN-112332031MT (Year: 2021).*

*Primary Examiner* — Alexander Usyatinsky
(74) *Attorney, Agent, or Firm* — Burris Law, PLLC

(57)                ABSTRACT

A cell connector for connecting round cells of a battery includes a plurality of electrical contact elements that are each configured to electrically connect a first round cell to a second round cell. The each electrical contact element includes a contact base. The electrical contact elements can each be connected via the contact base to a positive terminal of the first round cell in a material-bonded manner. The electrical contact elements each includes a plurality of contact tabs, with which the electrical contact elements can each be contacted to a negative terminal of the second round cell. An electrical contact element is respectively connected via an electrically conductive connecting bridge to a further electrical contact element. In an area between the electrically conductive connecting bridge and at least one contact tab adjacent to the electrically conductive connecting bridge material of the electrical contact element is recessed.

7 Claims, 3 Drawing Sheets

(51) Int. Cl.
    *H01M 50/213*      (2021.01)
    *H01M 50/505*      (2021.01)
    *H01M 50/516*      (2021.01)
    *H01M 50/569*      (2021.01)

(52) U.S. Cl.
    CPC ....... *H01M 50/505* (2021.01); *H01M 50/516* (2021.01); *H01M 50/569* (2021.01); *H01M 2220/20* (2013.01)

(56)            References Cited

U.S. PATENT DOCUMENTS

| | | | | |
|---|---|---|---|---|
| 2012/0276431 | A1* | 11/2012 | Groshert | ............. H01M 50/503 |
| | | | | 174/126.1 |
| 2013/0004823 | A1* | 1/2013 | Groshert | ............. H01M 50/522 |
| | | | | 429/158 |

FOREIGN PATENT DOCUMENTS

| | | |
|---|---|---|
| DE | 102019120496 | 2/2021 |
| DE | 102019120497 | 2/2021 |
| WO | 2020094218 | 5/2020 |

* cited by examiner

CELL CONNECTOR FOR CONNECTING ROUND CELLS OF A BATTERY

CROSS-REFERENCE TO RELATED APPLICATIONS

This application claims priority to and the benefit of German Patent Application No. 10 2021 124 360.2, filed on Sep. 21, 2021. The disclosure of the above application is incorporated herein by reference.

FIELD

The present disclosure relates to a cell connector for connecting round cells of a battery.

BACKGROUND

The statements in this section merely provide background information related to the present disclosure and may not constitute prior art.

In electrically powered vehicles, the energy for the drive of the vehicle is taken from a battery. The battery generally consists of a plurality of battery cells connected in parallel and in series. When the vehicle is operated, energy is taken from the battery so that the battery discharges. The battery cells can be electrically connected to one another via electrical contact elements to form a battery cell group. The electrical contact elements are made from a bronze alloy and each comprise a contact base that is welded to a positive terminal of a battery cell. The electrical contact elements also each comprise contact tabs that are connected to the contact base and contact a negative terminal of a further battery cell. As a result, an electrical contact of two battery cells is created. The battery cells are disposed in a battery housing that is usually made from plastic.

Since plastic has a much higher coefficient of thermal expansion than the bronze alloy of the electrical contact elements, the electrical contact elements expand or contract unevenly when exposed to heat during electrical loading of the battery cells or when the battery cools down. The uneven expansion or contraction leads to mechanical stresses on the electrical contact elements, and thus also to mechanical stresses on the weld connection between the positive terminal of the battery cell and the contact base of the electrical contact element.

SUMMARY

This section provides a general summary of the disclosure and is not a comprehensive disclosure of its full scope or all of its features.

In one form, the present disclosure provides a reliable electrical connection of a plurality of round cells of a battery.

One aspect of the present disclosure relates to a cell connector for connecting round cells of a battery comprising a plurality of electrical contact elements that are each configured to electrically connect a first round cell to a second round cell. The electrical contact elements each comprise a contact base, wherein the electrical contact elements can each be connected to a positive terminal of the first round cell in a material-bonded manner. The electrical contact elements each comprise a plurality of contact tabs, with which the electrical contact elements can each be connected to a negative terminal of the second round cell, and an electrical contact element is respectively connected to a further electrical contact element via an electrically conductive connecting bridge, wherein in an area between the electrically conductive connecting bridge and at least one contact tab adjacent to the electrically conductive connecting bridge material of the electrical contact element is recessed, and the recessed area is directly adjacent to the contact base.

The cell connector comprises a plurality of electrical contact elements. The electrical contact elements are made from an electrically conductive material. An electrical contact element is configured to electrically connect the first round cell to the second round cell. A further electrical contact element of the cell connector is configured to electrically connect a third round cell to a fourth round cell at the front side. The electrical contact elements can be connected in series via the electrically conductive connecting bridge. The round cells can be inserted into a battery housing. The round cells can also be electrically connected to battery modules. The individual battery modules are then electrically connected to a common battery. The battery is a battery for an electric drive of a motor vehicle. Within the meaning of the present disclosure, a "motor vehicle" is understood to mean both purely electrically powered motor vehicles as well as hybrid vehicles.

The contact base of an electrical contact element can be connected in a material-bonded manner to a positive terminal of the first round cell. In one form, the contact base can be welded to the positive terminal. In the case of the first round cell, the positive terminal can be a cell cap of the round cell. The electrical contact element also comprises a plurality of contact tabs. The contact tabs are disposed on the contact base and connected thereto. By using the contact tabs, an electrical contact of the electrical contact element to the second round cell can be made in that the contact tabs contact the negative terminal of the second round cell. In the case of the second round cell, the negative terminal can be the outer surface of the round cell. Here the contact tabs can nestle against the outer surface of the second round cell. The second round cell can be inserted with its outer surface between the contact tabs; as a result of which the round cells are held in a friction-locked manner between the contact tabs.

In one form, the contact base can be configured raised, that is, the contact base is raised in the opposite direction to the direction in which the contact tabs extend. The electrical contact element can thereby be particularly easily connected to the positive terminal of the round cell in a material-bonded manner.

In the area between the electrical connecting bridge and at least one contact tab of the electrical contact element, which contact tab is adjacent to the electrically conductive connecting bridge, material of the electrical contact element is recessed. The recessed area is directly adjacent to the contact base of the electrical contact element.

When the round cells move inside the battery, forces act on the weld connection of the contact base and on the contact tabs of the electrical contact elements, causing the contact base and the contact tabs to be mechanically stressed. The recessed area confers flexibility to the electrically conductive connecting bridge of the cell connector, so that the electrically conductive connecting bridge can compensate for movements of the round cells. In one form, the electrically conductive connecting bridge can thereby also be slightly compressed or expanded and thus compensate for movements of the round cells. The mechanical stresses are reduced in this way, and a reliable electrical contact is provided between the round cells.

In one variation, the connecting bridge comprises a flexible area that is configured to absorb mechanical stresses. In one form, the flexible area can be compressed or expanded during a movement of the round cells, so that the cell connector can compensate for the movements of the round cells.

In one variation, in the area of the recessed material the connecting bridge comprises a slope relative to the contact base. This facilitates that only a reduced mechanical stress is transferred to the contact base during a movement of the round cells. In this way, the contact base can also be easily connected in a material-bonded manner to the positive terminal of the round cell.

In one variation, the electrical contact elements are disposed in a plurality of rows and columns with respect to one another, and the respective directly adjacent electrical contact elements are each connected to one another via one of the connecting bridges. A high capacity is desired, in one form for electric vehicles. In one variation, it is desirable for the battery to use numerous round cells that are electrically connected to one another. As a result of this, it is possible to electrically interconnect a large number of round cells in series and in parallel, thus providing a battery having a very high capacity.

In one variation, the contact tabs are spring-loaded. The contact tabs can thereby desirably nestle against the outer surface of the second round cell. In one form, a spring force can act on the contact tabs. If the thermal stress relaxation is very high, the contact tabs lose the contact pressure against the outer surface of the second battery cell over time. In one form, the material of the electrical contact element can be reshaped in the area of the contact tabs, so that in the area of the contact tabs the spring force is increased, and thus a permanent electrical contact is provided between the contact tabs and the negative terminal of the second battery cell.

In one variation, the contact tabs each comprise curved surfaces, as a result of which it is possible for the contact tabs to nestle flatly against the negative terminal of the second round cell.

In one variation, a voltage tap is disposed on at least one of the electrical contact elements, which voltage tap is configured to measure a voltage of the first round cell and the second round cell. The voltage tap is used to balance the round cells during operation of the battery. When balancing the round cells, the voltages of each round cell or each cell group connected in parallel are monitored. The voltage tap can be disposed, in one form, on an externally disposed electrical contact element of the cell connector and be configured, in one form, in the form of a contact tab. Each individual round cell of a battery module thus need not be individually monitored, but rather the connected round cells of the battery module are monitored among one another via the voltage tap.

In one variation, the cell connector is made from at least one stamped bent part.

A common stamped bent part, from which the electrical contact elements and the electrically conductive connecting bridges are made, is in one variation stamped out of a material having good electrical conductivity, and correspondingly reshaped in order to achieve the shape of the individual electrical contact elements. Here the material of the stamped bent part should in one variation be selected such that it meets requirements with respect to good electrical conductivity and mechanical requirements, in one form in terms of high tensile strengths and low thermal stress relaxation.

In one form, the stamped bent part can be made from a first metal plate and from a second metal plate that are connected to each other in a superposed manner. The first metal plate can have a better electrical conductivity than the second metal plate. The second metal plate can have a higher spring stiffness than the first metal plate.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
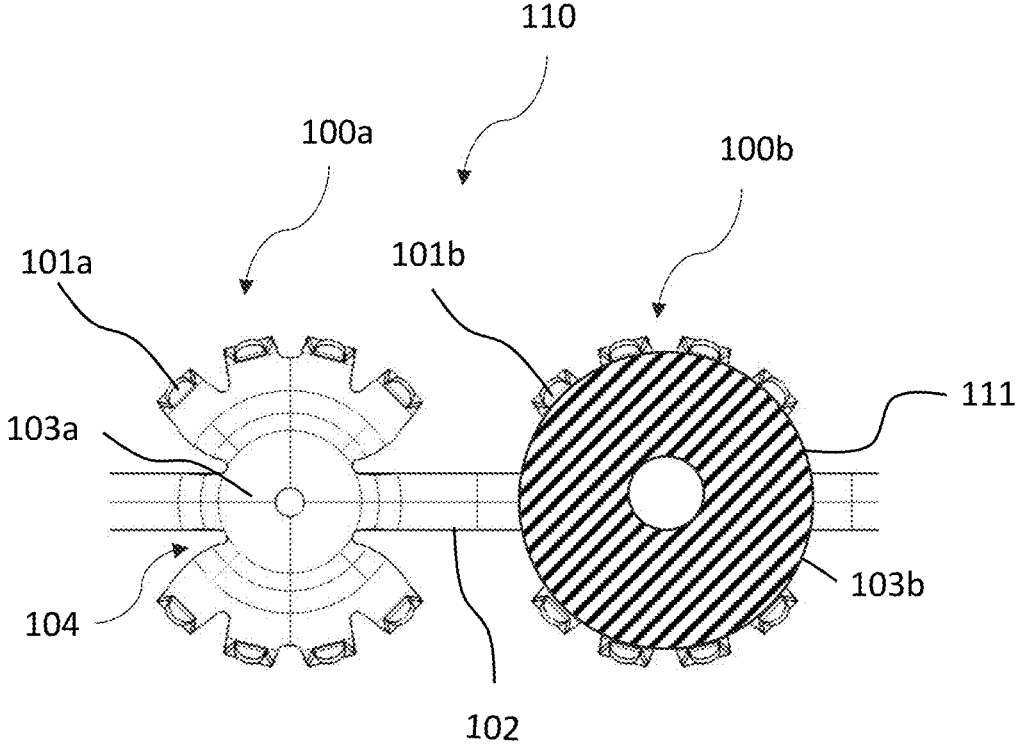
FIG. 1 shows a plan view of a cell connector in a first variation, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a plan view of the cell connector in a first variation. The cell connector 110 comprises a first electrical contact element 100a and a second electrical contact element 100b. The first electrical contact element 100a and the second electrical contact element 100b are connected to each other via a connecting bridge 102. In the first variation, the cell connector 100 is made from a stamped bent part. In another variation, the cell connector can be comprised of individual components that are welded to one another. The first contact element 100a and the second contact element 100b respectively serve to electrically connect a first round cell to a second round cell. The first electrical contact element 100a and the second electrical contact element 100b each comprise a contact base 103a, 103b.

At the respective contact base 103a, 103b, the first electrical contact element 100a and the second electrical contact element 100b are each welded to a positive terminal of the first round cell, i.e., the respective contact base 103a, 103b is connected in a material-bonded manner to the positive terminal of the respective first round cell. The first electrical contact element 100a and the second electrical contact element 100b also comprise contact tabs 101a, 101b. The contact tabs are used to contact respective negative terminals of respective second round cells 111. In the case of a round cell, the outer surface of the round cell forms the negative terminal. In the first variation, the contact tabs 101a, 101b are spring-loaded. In addition, the ends of the contact tabs 101a, 101b are bent outward, so that inserting the negative terminal of the second round cell 111 between the contact tabs 101a, 101b is simplified.

It can be seen from FIG. 1 that between the connecting bridge 102 and the respective adjacent contact tabs 101a, 101b, material of the contact elements 100a, 100b is recessed in one area. The area 104 that is recessed from the material serves to allow the cell connector 110 to achieve an increased flexibility and thus compensate for movements of the round cells in all spatial axes, if desired.

Figure 2:
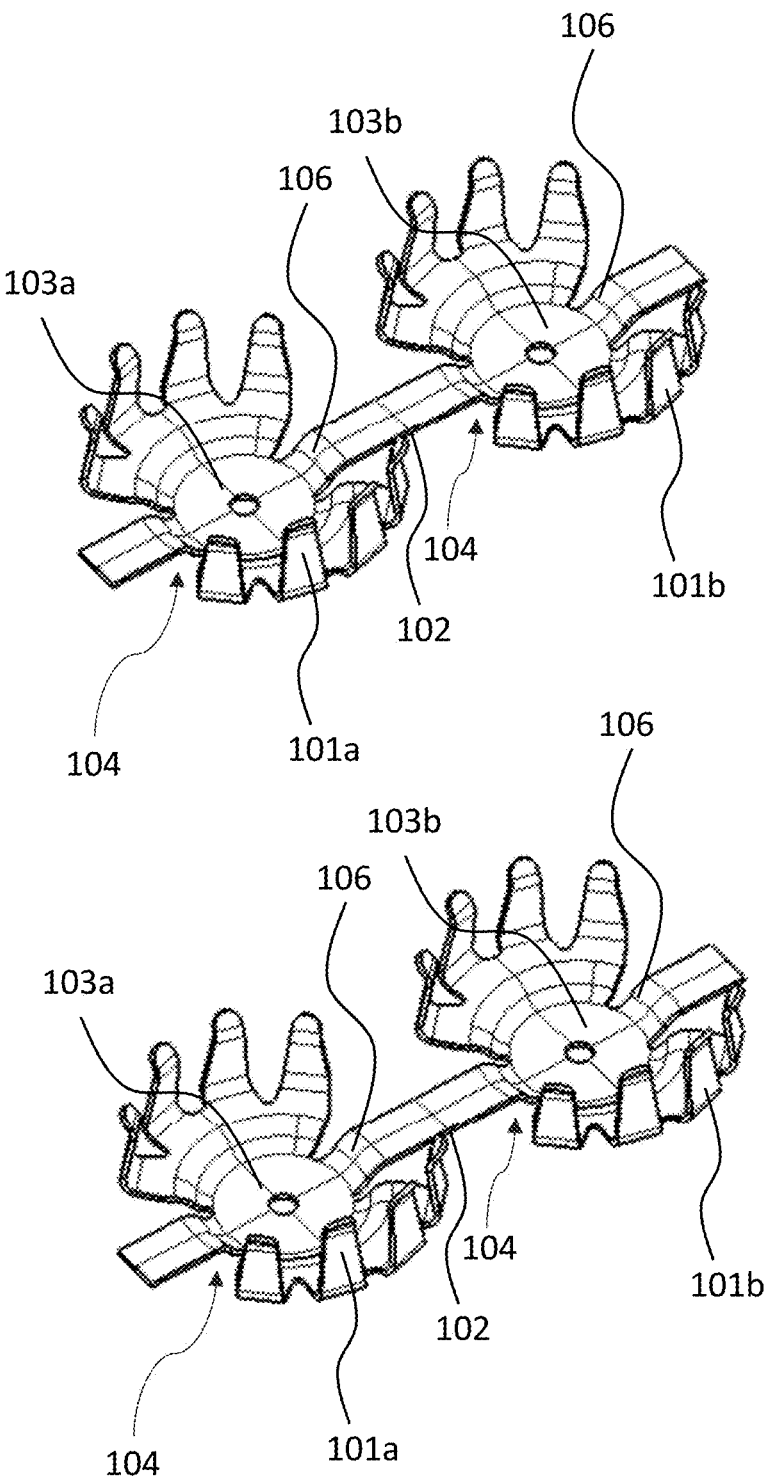
FIG. 2 shows a perspective view of the cell connector in the first variation shown in FIG. 1, according to the teachings of the present disclosure.

FIG. 2 shows a perspective view of the cell connector 110 in the first variation. The connecting bridge 102 is raised relative to the contact bases 103a, 103b. This is achieved such that the first round cells, which are each connected to the contact bases 103a, 103b in a material-bonded manner, can be disposed adjacent to one another in rows and columns in a space-saving manner. In the area of the contact bases 103a, 103b, the connecting bridge 102 of the cell connector 110 comprises slopes 106. The slopes 106 favor a mechanical decoupling of the connecting bridge 102.

A battery comprises a plurality of components made of the most diverse materials. Due to the wide variety of temperature expansion coefficients, the components can expand or contract differently and thus change their shape when the battery is thermally stressed. These movements of the components can cause the cell connector to be mechanically stressed in an unacceptable manner. The slope 106 provides that the contact base 103a, 103b is mechanically decoupled from the connecting bridge 102, and thus the forces that act on the connecting bridge 102 are not transferred in the same manner to the contact base 103a, 103b.

Figure 3:
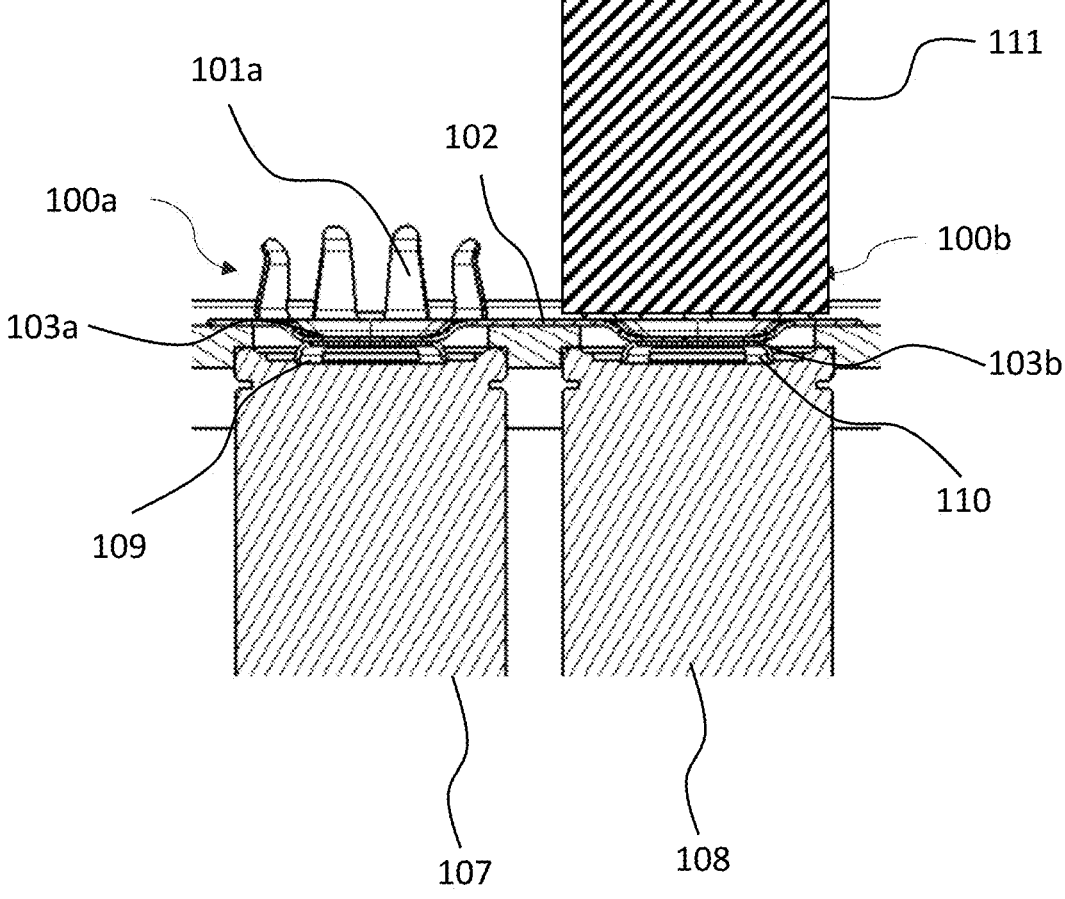
FIG. 3 shows a side view of the cell connector in a second variation, according to the teachings of the present disclosure.

FIG. 3 shows a side view of the cell connector in a second variation. A positive terminal 109 of a first round cell 107 is welded to the contact base 103a of the first electrical contact element 100a. A positive terminal 110 of a third round cell 108 is welded to the contact base 103b of the second electrical contact element 100b. Further round cells 111 can be attached to the first electrical contact element 100a and to the second electrical contact element 100b between the contact tabs 101a, 101b. The contact tabs 101a, 101b then encompass the outer surface of the further round cells 111 for fixing the round cells 111 on the respective electrical contact element 100a, 100b, and the contact tabs 101a, 101b simultaneously contact the negative terminal of the round cells 111.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cell connector for connecting round cells of a battery, the cell connector comprising:

a plurality of electrical contact elements, wherein each of the plurality of electrical contact elements is configured to electrically connect a first round cell to a second round cell, wherein:

each of the plurality of electrical contact elements comprises a contact base, wherein each of the plurality of electrical contact elements is connected via the contact base to a positive terminal of the first round cell in a material-bonded manner, each of the plurality of electrical contact elements comprises a plurality of contact tabs, wherein the plurality of contact tabs of each of the electrical contact elements is configured to connect to a negative terminal of the second round cell; and an electrical contact element among the plurality of electrical contact elements is respectively connected via an electrically conductive connecting bridge to a further electrical contact element, wherein material of the electrical contact element is recessed in an area between the electrically conductive connecting bridge and at least one contact tab adjacent to the electrically conductive connecting bridge, and the recessed material is directly adjacent to the contact base.

2. The cell connector according to claim 1, wherein the electrically conductive connecting bridge comprises a slope relative to the contact base in the area of the recessed material configured to absorb mechanical stresses.

3. The cell connector according to claim 1, wherein the plurality of electrical contact elements are disposed in a plurality of rows and columns with respect to one another, and respective directly adjacent electrical contact elements are each connected to one another by one of a plurality of electrically conductive connecting bridges.

4. The cell connector according to claim 1, wherein the plurality of contact tabs are spring-loaded.

5. The cell connector according to claim 1, wherein each of the plurality of contact tabs comprise curved surfaces, thereby enabling the contact tabs to nestle flatly against the negative terminal of the second round cell.

6. The cell connector according to claim 1, wherein a voltage tap is disposed on at least one of the plurality of electrical contact elements, wherein the voltage tap is configured to measure a voltage of the first round cell and of the second round cell.

7. The cell connector according to claim 1, wherein the cell connector is made from at least one stamped bent part.

* * * * *